United States Patent
Kim et al.

(10) Patent No.: US 12,294,089 B2
(45) Date of Patent: May 6, 2025

(54) ANODE FOR ALL-SOLID-STATE BATTERY COMPRISING METAL-THIN-FILM COATING LAYER AND METHOD OF MANUFACTURING SAME

(71) Applicants: Hyundai Motor Company, Seoul (KR); Kia Corporation, Seoul (KR)

(72) Inventors: Yong Gu Kim, Suwon-si (KR); Yun Sung Kim, Seoul (KR); Sa Heum Kim, Suwon-si (KR); Hong Seok Min, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 129 days.

(21) Appl. No.: 17/533,249

(22) Filed: Nov. 23, 2021

(65) Prior Publication Data

US 2022/0190347 A1 Jun. 16, 2022

(30) Foreign Application Priority Data

Dec. 10, 2020 (KR) ........................ 10-2020-0172415

(51) Int. Cl.
*H01M 4/66* (2006.01)
*H01M 4/04* (2006.01)

(52) U.S. Cl.
CPC ......... *H01M 4/661* (2013.01); *H01M 4/0404* (2013.01)

(58) Field of Classification Search
CPC ..... H01M 4/661; H01M 4/0404; H01M 4/667
See application file for complete search history.

(56) References Cited

U.S. PATENT DOCUMENTS

| | | | |
|---|---|---|---|
| 4,011,372 A * | 3/1977 | Tomczuk | H01M 4/742 429/231.95 |
| 2019/0157723 A1* | 5/2019 | Yashiro | H01M 10/0562 |
| 2020/0185768 A1* | 6/2020 | Kang | H01M 10/0562 |
| 2020/0313164 A1* | 10/2020 | Suzuki | H01M 4/133 |
| 2020/0373609 A1* | 11/2020 | Yashiro | H01M 4/587 |

FOREIGN PATENT DOCUMENTS

| | | | | |
|---|---|---|---|---|
| JP | 2018129159 A | * | 8/2018 | ........ H01M 10/0525 |
| KR | 20200056039 A | | 5/2020 | |

* cited by examiner

*Primary Examiner* — Sean P Cullen
*Assistant Examiner* — Jonathan William Estes
(74) *Attorney, Agent, or Firm* — SLATER MATSIL, LLP

(57) ABSTRACT

An embodiment anode for an all-solid-state battery includes an anode current collector, and a coating layer disposed on the anode current collector, wherein the coating layer is a thin film including at least one metal selected from the group consisting of alkaline earth metals, Group 4 to 9 transition metals, Group 13 metals, or combinations thereof.

9 Claims, 3 Drawing Sheets

ANODE FOR ALL-SOLID-STATE BATTERY COMPRISING METAL-THIN-FILM COATING LAYER AND METHOD OF MANUFACTURING SAME

CROSS-REFERENCE TO RELATED APPLICATIONS

This application claims the benefit of Korean Patent Application No. 10-2020-0172415, filed on Dec. 10, 2020, which application is hereby incorporated herein by reference.

TECHNICAL FIELD

The present disclosure relates to an anode for an all-solid-state battery including a metal-thin-film coating layer and a method of manufacturing the same.

BACKGROUND

As an environmental issue, efforts to switch from vehicles using internal combustion engines to electric vehicles are ongoing in individual countries. One of the biggest issues at present is the development of high-capacity long-lifetime batteries. Lithium-ion batteries have limitations in increasing the capacity thereof, and poor stability due to the use of flammable liquid electrolytes.

In order to overcome the limitations of lithium-ion batteries, interest in next-generation batteries such as lithium-air batteries, lithium-sulfur batteries, all-solid-state batteries and the like is increasing. However, lithium-air batteries and lithium-sulfur batteries do not exhibit lifetime characteristics close to the level required for commercialization because of deterioration due to internal side reactions. Unlike other batteries that use a liquid electrolyte, an all-solid-state battery uses a solid electrolyte and thus does not require subsidiary materials such as a separator and the like, which is advantageous from the aspect of energy density. Moreover, since a flammable liquid electrolyte is not used, stability is high, and a cooling system is not required in order to alleviate the temperature rise that occurs when the battery is used.

In addition to graphite, various types of anodes such as lithium metal, metal foil/foam, carbon fiber/tube and the like are being considered in order to improve the capacity and lifetime characteristics of all-solid-state batteries.

SUMMARY

The present disclosure relates to an anode for an all-solid-state battery including a metal-thin-film coating layer and a method of manufacturing the same. Particular embodiments relate to an anode for an all-solid-state battery including an anode current collector and a thin-film coating layer disposed on the anode current collector and configured to include at least one selected from the group consisting of alkaline earth metals, Group 4 to 9 transition metals, Group 13 metals, and combinations thereof, and to a method of manufacturing the same.

Therefore, an embodiment of the present disclosure provides an anode for an all-solid-state battery having a novel structure capable of greatly increasing energy density.

Another embodiment of the present disclosure provides an anode for an all-solid-state battery having improved capacity and lifetime characteristics.

The embodiments of the present disclosure are not limited to the foregoing, and will be able to be clearly understood through the following description and to be realized by the means described in the claims and combinations thereof.

An embodiment of the present disclosure provides an anode for an all-solid-state battery including an anode current collector and a coating layer disposed on the anode current collector, in which the coating layer may include at least one selected from the group consisting of alkaline earth metals, Group 4 to 9 transition metals, Group 13 metals, and combinations thereof.

The anode current collector may include at least one selected from the group consisting of nickel, stainless steel, and combinations thereof.

The coating layer may include at least one selected from the group consisting of magnesium (Mg), aluminum (Al), silver (Ag), and combinations thereof.

The coating layer may have a thickness of 50 nm to 1,000 nm.

The coating layer may be alloyed with lithium when the all-solid-state battery is charged.

Another embodiment of the present disclosure provides an all-solid-state battery, including a cathode, the anode described above, and a solid electrolyte layer disposed between the cathode and the anode, in which the solid electrolyte layer may be laminated so as to contact a coating layer of the anode.

Still another embodiment of the present disclosure provides a method of manufacturing an anode for an all-solid-state battery, including forming a coating layer by coating an anode current collector with a source including at least one selected from the group consisting of alkaline earth metals, Group 4 to 9 transition metals, Group 13 metals, and combinations thereof through thermal evaporation.

The coating layer may be a thin film including at least one selected from the group consisting of alkaline earth metals, Group 4 to 9 transition metals, Group 13 metals, and combinations thereof.

According to embodiments of the present disclosure, an all-solid-state battery imparted with greatly increased energy density by significantly reducing the volume and weight thereof can be obtained.

Also, according to embodiments of the present disclosure, an all-solid-state battery having high energy density and improved capacity and lifetime characteristics can be obtained.

The effects of embodiments of the present disclosure are not limited to the foregoing, and should be understood to include all effects that can be reasonably anticipated from the following description.

DETAILED DESCRIPTION OF ILLUSTRATIVE EMBODIMENTS

Figure 1:
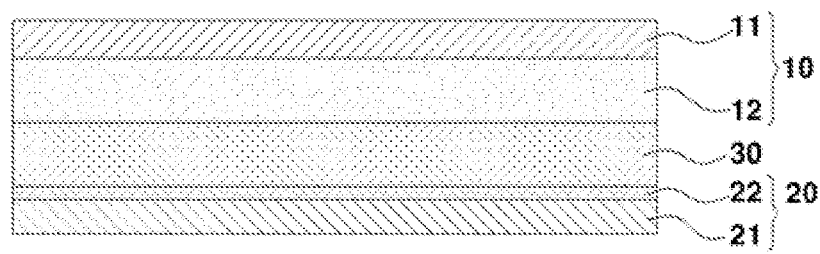
FIG. 1 is a cross-sectional view showing an all-solid-state battery according to embodiments of the present disclosure.

The above and other objectives, features and advantages of embodiments of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the aft.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a cross-sectional view showing an all-solid-state battery according to embodiments of the present disclosure. With reference thereto, the all-solid-state battery includes a cathode 10 including a cathode current collector 11 and a cathode active material layer 12, an anode 20 including an anode current collector 21 and a coating layer 22, and a solid electrolyte layer 30 disposed between the cathode 10 and the anode 20. Here, the coating layer 22 and the solid electrolyte layer 30 may be laminated so as to contact each other.

The cathode current collector 11 may be a plate-like substrate having electrical conductivity. The cathode current collector 11 may include an aluminum foil.

The cathode active material layer 12 may include a cathode active material, a solid electrolyte, a conductive material, a binder, and the like.

The cathode active material may be an oxide active material or a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ or the like, a spinel-type active material such as $LiMn_2O_4$, $Li(Ni_{0.5}Mn_{1.5})O_4$ or the like, an inverse-spinel-type active material such as $LiNiVO_4$, $LiCoVO_4$ or the like, an olivine-type active material such as $LiFePO_4$, $LiMnPO_4$, $LiCoPO_4$, $LiNiPO_4$ or the like, a silicon-containing active material such as $Li_2FeSiO_4$, $Li_2MnSiO_4$ or the like, a rock-salt-layer-type active material in which a portion of a transition metal is substituted with a different metal, such as $LiNi_{0.8}Co_{(0.2-x)}(Al_xO_2$ $(0<x<0.2)$, a spinel-type active material in which a portion of a transition metal is substituted with a different metal, such as $Li_{1+x}Mn_{2-x-y}M_yO_4$ (M being at least one of Al, Mg, Co, Fe, Ni and Zn, $0<x+y<2$), or lithium titanate such as $Li_4Ti_5O_{12}$ or the like.

The sulfide active material may be copper chevrel, iron sulfide, cobalt sulfide, nickel sulfide, etc.

The solid electrolyte may be an oxide solid electrolyte or a sulfide solid electrolyte. Here, the use of a sulfide-based solid electrolyte, having high lithium ionic conductivity, is preferable. The sulfide-based solid electrolyte is not particularly limited, and may be $Li_2S-P_2S_5$, $Li_2S-P_2S_5-LiI$, $L_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (in which m and n are positive numbers, and Z is any one of Ge, Zn and Ga), $Li_2S-GeS_2$, $Li_2S-SiS_2-Li_3PO_4$, $Li_2S-SiS_2-Li_xMO_y$ (in which x and y are positive numbers, and M is any one of P, Si, Ge, B, Al, Ga and In), $Li_{10}GeP_2S_{12}$, etc.

The conductive material may be carbon black, conductive graphite, ethylene black, graphene, etc.

The binder may be BR (butadiene rubber), NBR (nitrile butadiene rubber), HNBR (hydrogenated nitrile butadiene rubber), PVDF (polyvinylidene difluoride), PTFE (polytetrafluoroethylene), CMC (carboxymethylcellulose), etc.

The solid electrolyte layer 30 may be interposed between the cathode 10 and the anode 20 so that lithium ions may move between the two components.

The solid electrolyte layer 30 may include an oxide-based solid electrolyte or a sulfide-based solid electrolyte. Here, the use of a sulfide-based solid electrolyte, having high lithium ionic conductivity, is preferable. The sulfide-based solid electrolyte is not particularly limited, and may be $Li_2S-P_2S_5$, $Li_2S-P_2S_5-LiI$, $Li_2S-LiCl$, $Li_2S-P_2S_5-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (in which m and n are positive numbers, and Z is any one of Ge, Zn and Ga), $Li_2S-GeS_2$, $Li_2S-SiS_2-Li_3PO_4$, $Li_2S-SiS_2-Li_xMO_y$ (in which x and y are positive numbers, and M is any one of P, Si, Ge, B, Al, Ga and In), $Li_{10}GeP_2S_{12}$, etc.

The anode 20 includes an anode current collector 21 and a coating layer 22 disposed on the anode current collector 21.

The anode current collector 21 may be a plate-like substrate having electrical conductivity. The anode current collector 21 may include at least one selected from the group consisting of nickel (Ni), stainless steel (SUS), and combinations thereof.

The anode current collector 21 may be a high-density metal thin film having a porosity less than about 1%.

The anode current collector 21 may have a thickness of 1 μm to 20 μm, or 5 μm to 15 μm.

Figure 2:
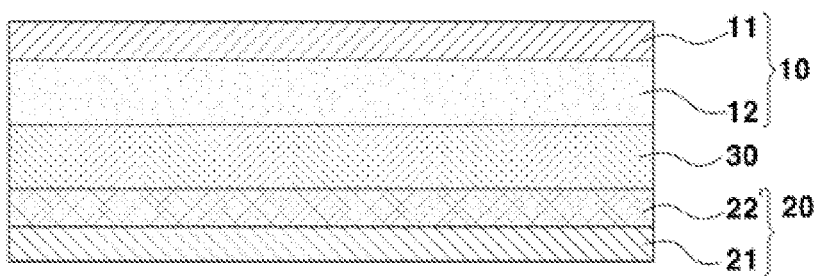
FIG. 2 is a cross-sectional view showing the state in which the all-solid-state battery according to embodiments of the present disclosure is charged.

FIG. 2 is a cross-sectional view showing the state in which the all-solid-state battery according to embodiments of the present disclosure is charged. With reference to FIGS. 1 and 2, when the battery is charged, lithium ions moved from the cathode 10 may be alloyed with the coating layer 22 and stored in the form of a lithium alloy layer 22' in the anode 20.

The coating layer 22 may be a thin film including at least one selected from the group consisting of alkaline earth metals, Group 4 to 9 transition metals, Group 13 metals, and combinations thereof. Specifically, the coating layer 22 may be a thin film including at least one selected from the group consisting of magnesium (Mg), aluminum (Al), silver (Ag), and combinations thereof.

Since the coating layer 22 is a thin film made of a material capable of alloying with lithium or forming a compound, stable intercalation/deintercalation of lithium may be induced, thereby prolonging the lifetime of the battery.

The coating layer 22 may have a thickness of 50 nm to 1,000 nm, 100 nm to 1,000 nm, or 300 nm to 1,000 nm. Compared to a conventional all-solid-state battery using a graphite-based anode active material, the thickness of the anode of embodiments of the present disclosure may be significantly reduced, so the energy density of the battery may be greatly improved.

Moreover, the thickness of the coating layer 22 may be appropriately adjusted depending on the amount of lithium that is intercalated according to a design. As the coating layer 22 is thicker, the amount of lithium that is intercalated increases.

A method of manufacturing the anode for an all-solid-state battery according to embodiments of the present disclosure may include forming a coating layer by coating an anode current collector with a source including at least one selected from the group consisting of alkaline earth metals, Group 4 to 9 transition metals, Group 13 metals, and combinations thereof through thermal evaporation.

Specifically, the anode current collector is fixed in the chamber of a thermal evaporator, after which a source including magnesium (Mg), aluminum (Al), silver (Ag), etc. is placed in the evaporator. The chamber is evacuated, after which heat is applied to evaporate the source, thereby forming a coating layer on the anode current collector.

Meanwhile, the coating layer may be manufactured through other processes such as sputtering, doctor-blade coating, and the like, in addition to the above-described thermal evaporation process.

A better understanding of the present disclosure may be obtained through the following examples. These examples are merely set forth to illustrate embodiments of the present disclosure, and are not to be construed as limiting the scope of the present disclosure.

EXAMPLE 1 TO EXAMPLE 4 and COMPARATIVE EXAMPLE

The all-solid-state battery of Example 1 was manufactured as follows.

(Manufacture of cathode) A cathode active material, a solid electrolyte, a conductive material, a binder, a dispersant and a solvent were mixed to afford a slurry. The slurry was applied on a cathode current collector and dried, thus manufacturing a cathode.

(Manufacture of solid electrolyte layer) A solid electrolyte, a binder, and a solvent were mixed, and the resulting solution was applied on the cathode and dried, thus obtaining a solid electrolyte layer.

(Manufacture of anode) An anode current collector was fixed to the upper rotor of a thermal evaporator, and a silver (Ag) source was placed in the evaporator. The chamber was evacuated, and heat was applied to evaporate the aluminum, thereby forming an aluminum thin film having a thickness of 100 nm on the surface of the anode current collector.

The cathode, the solid electrolyte layer and the anode were laminated as shown in FIG. 1, ultimately obtaining the all-solid-state battery of Example 1.

The all-solid-state battery of Example 2 was manufactured in the same manner as in Example 1, with the exception that the source for the coating layer was replaced with aluminum (Al).

The all-solid-state battery of Example 3 was manufactured in the same manner as in Example 1, with the exception that the source for the coating layer was replaced with magnesium (Mg) and the thickness of the coating layer was adjusted to 50 nm.

The all-solid-state battery of Example 4 was manufactured in the same manner as in Example 1, with the exception that the source for the coating layer was replaced with magnesium (Mg).

The all-solid-state battery of the Comparative Example that was used was a conventional all-solid-state battery using graphite as the anode active material. A slurry was prepared by mixing graphite, a solid electrolyte, a binder, a dispersant, and a solvent, and the slurry was applied on an anode current collector and dried, thus manufacturing an anode.

The anode materials and thicknesses of Example 1 to Example 4 and the Comparative Example are summarized in Table 1 below.

Figure 3:
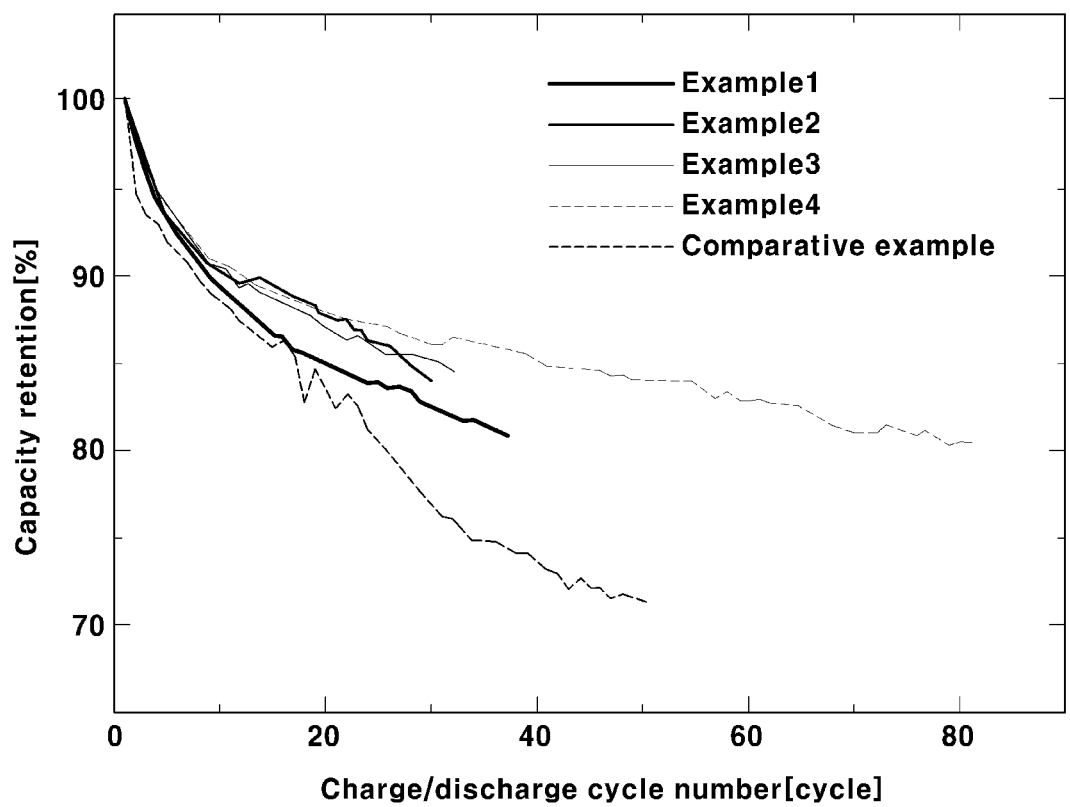
FIG. 3 shows the results of measurement of initial capacity retention of the all-solid-state batteries of Example 1 to Example 4 and a Comparative Example.

Also, the initial capacity of the all-solid-state battery of each of Example 1 to Example 4 and the Comparative Example and the retention thereof were measured. The results thereof are shown in FIG. 3 and in Table 1 below.

TABLE 1

| Classi-fication | Comparative Example | Example 1 | Example 2 | Example 3 | Example 4 |
|---|---|---|---|---|---|
| Anode material | Graphite | Silver (Ag) | Aluminum (Al) | Magnesium (Mg) | Magnesium (Mg) |
| Anode thickness* | 70 μm | 100 nm | 100 nm | 50 nm | 100 nm |
| Initial capacity [mAh/g] | 178 | 172 | 173 | 172 | 175 |
| Capacity retention | 71% (@50 cycles) | 81% (@37 cycles) | 87% (@30 cycles) | 85% (@32 cycles) | 80% (@81 cycles) |

*The anode thickness in Table 1 refers to the thickness excluding the anode current collector.

As is apparent from FIG. 1 and Table 1, Example 1 to Example 4 maintained 80% or more of the initial capacity thereof, even after 30 cycles. However, in the Comparative Example, the capacity retention was drastically decreased after 20 charge/discharge cycles.

EXAMPLE 5 AND EXAMPLE 6

The all-solid-state battery of Example 5 was manufactured in the same manner as in Example 4, with the exception that the thickness of the coating layer was adjusted to 300 nm.

The all-solid-state battery of Example 6 was manufactured in the same manner as in Example 4, with the exception that the thickness of the coating layer was adjusted to 500 nm.

Figure 4:
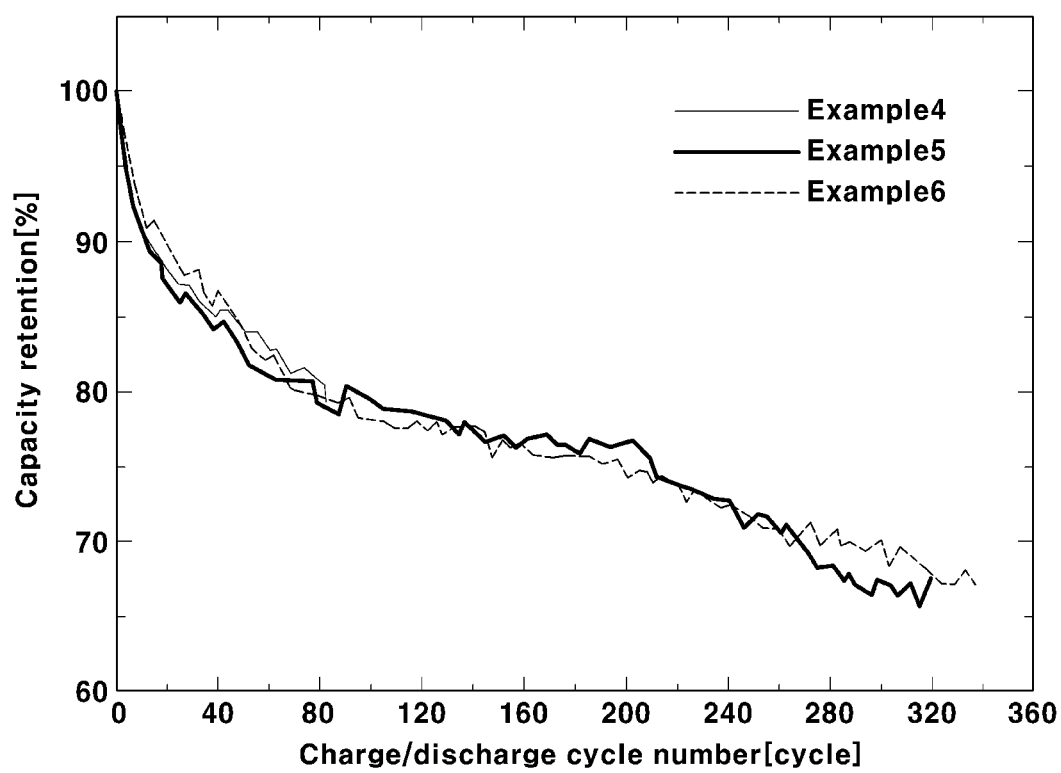
FIG. 4 shows the results of measurement of initial capacity retention of the all-solid-state batteries of Example 4 to Example 6.

The initial capacity of the all-solid-state battery of each of Example 4 to Example 6 and the retention thereof were measured. The results thereof are shown in FIG. 4 and in Table 2 below.

TABLE 2

| Classification | Example 4 | Example 5 | Example 6 |
|---|---|---|---|
| Anode material | Magnesium (Mg) | Magnesium (Mg) | Magnesium (Mg) |
| Anode thickness* | 100 nm | 300 nm | 500 nm |
| Initial capacity [mAh/g] | 175 | 169 | 165 |
| Charge/discharge cycle number for capacity retention of 80% | 81 cycles | 78 cycles | 73 cycles |
| Final capacity retention | 80% (@81 cycles) | 67% (@320 cycles) | 67% (338 cycles) |

*The anode thickness in Table 2 refers to the thickness excluding the anode current collector.

As is apparent from FIG. 4 and Table 2, in Example 4 to Example 6, the charge/discharge cycle number at which it was possible to maintain initial capacity retention of 80% exceeded 70 cycles. In particular, in Example 5 and Example 6, the capacity retention was 67% or more when the charge/discharge cycle numbers were 320 cycles and 338 cycles, respectively, indicating vastly superior lifetime characteristics.

The test examples and examples of embodiments of the present disclosure have been described in detail above, but the scope of the present invention is not limited to the test examples and examples described above. Various modifications and improvements capable of being devised by those skilled in the art using the basic concept of the present disclosure defined in the following claims also fall within the scope of the present disclosure.

What is claimed is:

1. An anode for an all-solid-state battery, the anode comprising:
    an anode current collector; and
    a coating layer disposed on the anode current collector, wherein the coating layer is a thin film consisting of at least one metal selected from the group consisting of alkaline earth metals, Group 4 to 9 transition metals, Group 13 metals, and combinations thereof, and
    wherein the anode excluding the anode current collector has a thickness of 300 nm to 500 nm.

2. The anode of claim 1, wherein the anode current collector comprises nickel, stainless steel, or combinations thereof.

3. The anode of claim 1, wherein the coating layer comprises magnesium (Mg), aluminum (Al), silver (Ag), or combinations thereof.

4. The anode of claim 1, wherein the coating layer is alloyed with lithium when the all-solid-state battery is in a charged state.

5. An all-solid-state battery, comprising:
    a cathode;
    an anode comprising:
        an anode current collector; and
        a coating layer disposed on the anode current collector, wherein the coating layer is a thin film consisting of at least one metal selected from the group consisting of alkaline earth metals, Group 4 to 9 transition metals, Group 13 metals, or combinations thereof, and
        wherein the anode excluding the anode current collector has a thickness of 300 nm to 500 nm; and
    a solid electrolyte layer disposed between the cathode and the anode, wherein the solid electrolyte layer is laminated to contact the coating layer of the anode.

6. The all-solid-state battery of claim 5, wherein the anode current collector comprises nickel, stainless steel, or combinations thereof.

7. The all-solid-state battery of claim 5, wherein the coating layer comprises magnesium (Mg), aluminum (Al), silver (Ag), or combinations thereof.

8. The all-solid-state battery of claim 5, wherein the coating layer is alloyed with lithium when the battery is in a charged state.

9. The anode of claim 1, wherein the anode does not include a separate anode active material layer.

* * * * *